US012774155B2

(12) United States Patent
Kampen et al.

(10) Patent No.: US 12,774,155 B2
(45) Date of Patent: Oct. 27, 2026

(54) TURN RADIUS COMPENSATION FOR CART DETECTION AND AUTOMATION

(71) Applicant: Oshkosh Corporation, Oshkosh, WI (US)

(72) Inventors: Leo Van Kampen, Conestogo (CA); Vince Schad, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 19/197,765

(22) Filed: May 2, 2025

(65) Prior Publication Data

US 2025/0340363 A1 Nov. 6, 2025

Related U.S. Application Data

(60) Provisional application No. 63/642,031, filed on May 3, 2024.

(51) Int. Cl.
*B65F 3/02* (2006.01)

(52) U.S. Cl.
CPC .............. *B65F 3/02* (2013.01); *B65F 3/0213* (2013.01); *B65F 2003/023* (2013.01); *B65F 2003/0276* (2013.01)

(58) Field of Classification Search
CPC .... B65F 3/02; B65F 3/0213; B65F 2003/023; B65F 2003/0276
See application file for complete search history.

(56) References Cited

U.S. PATENT DOCUMENTS

| | | | | |
|---|---|---|---|---|
| 9,403,278 | B1 * | 8/2016 | Van Kampen | B25J 9/1612 |
| 2007/0154068 | A1 * | 7/2007 | Stein | G01B 11/14 348/148 |
| 2025/0135652 | A1 | 5/2025 | Schad et al. | |

OTHER PUBLICATIONS

Agand, Pedram, Michael Chang, and Mo Chen. "Dmode: differential monocular object distance estimation module without class specific information." 2024 13th International Workshop on Robot Motion and Control (RoMoCo). IEEE, 2024. (Year: 2024).*

* cited by examiner

*Primary Examiner* — Dale Moyer
(74) *Attorney, Agent, or Firm* — Foley & Lardner LLP

(57) ABSTRACT

A control system for a refuse vehicle includes a camera configured to obtain image data of a target waste receptacle and at least one processor. The at least one processor is configured to determine a first pixel height from a first image of the target waste receptacle corresponding to the refuse vehicle in a first position along a route, determine a second pixel height from a second image of the target waste receptacle corresponding to the refuse vehicle in a second position along the route, and based on a change between the first pixel height and the second pixel height, compensate a measured distance between the refuse vehicle and the target waste receptacle.

20 Claims, 12 Drawing Sheets

TURN RADIUS COMPENSATION FOR CART DETECTION AND AUTOMATION

CROSS-REFERENCE TO RELATED APPLICATIONS

This application claims the benefit of and priority to U.S. Provisional Application No. 63/642,031, filed on May 3, 2024, the entire disclosure of which is hereby incorporated by reference herein.

BACKGROUND

The present disclosure relates generally to control systems for refuse vehicles. More particularly, the present disclosure relates to methods of compensating for vehicle turning during cart detection.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

An aspect of the present disclosure relates to a control system for a refuse vehicle. The control system includes a camera configured to obtain image data of a target waste receptacle, and at least one processor. The at least one processor is configured to determine a first pixel height from a first image of the target waste receptacle corresponding to the refuse vehicle in a first position along a route, determine a second pixel height from a second image of the target waste receptacle corresponding to the refuse vehicle in a second position along the route, and based on a change between the first pixel height and the second pixel height, determine a measured distance between the refuse vehicle and the target waste receptacle.

In various embodiments, the at least one processor is configured to determine at least one of a vehicle trajectory or a curvature of the route based at least on the measured distance. In some embodiments, the curvature of the route indicates the route curves away from the target waste receptacle. In other embodiments, the curvature of the route indicates the route curves toward the target waste receptacle. In yet other embodiments, the at least one processor is further configured to repeatedly determine the measured distance to determine a change in the measured distance. In various embodiments, the at least one processor is further configured to determine whether at least one of the first image or the second image satisfies a resolution threshold. In some embodiments, the at least one processor is further configured to determine whether the target waste receptacle is in position for measurement based on at least one of the first image or the second image satisfying the resolution threshold. In other embodiments, the at least one processor is further configured to determine whether the target waste receptacle is in position for collection based on the measured distance.

Another aspect of the present disclosure relates to a refuse vehicle. The refuse vehicle includes an arm structured to collect a target waste receptacle, a camera configured to obtain image data, and at least one processor communicatively coupled to the arm and the camera. The at least one processor is configured to determine whether a first image captured by the camera contains the target waste receptacle. Responsive to determining the first image contains the target waste receptacle, the at least one processor is further configured to determine whether the target waste receptacle is in a position to be measured. Responsive to determining the target waste receptacle is in the position to be measured, the at least one processor is further configured to determine a first distance of the target waste receptacle at a first time point from a second image. The at least one processor is further configured to determine a second distance of the target waste receptacle at a second time point from a third image. The at least one processor is further configured to, based on a first distance change between the second distance and the first distance, predict a second distance change between the second distance and a third distance at a third time point, and control the arm to collect the target waste receptacle based on the predicted second distance change.

In various embodiments, the at least one processor is configured to predict the second distance change based on a time elapsed between capture of the second image and the third image. In some embodiments, the at least one processor is further configured to determine a change in a height of the target waste receptacle from the second image and the third image. In other embodiments, the change in height is based on a change in pixel position. In yet other embodiments, the predicted second distance change is determined using one or more lookup tables. In various embodiments, the at least one processor is configured to determine whether the target waste receptacle is in a position to be measured based on a determination that the first image satisfies a resolution threshold. In some embodiments, the at least one processor is configured to determine whether a first image captured by the camera contains the target waste receptacle based on a comparison of the first image to a template representation stored in a database. In other embodiments, the at least one processor is configured to determine a radius of curvature of a route along which the refuse vehicle is traversing. In yet other embodiments, the at least one processor determines the radius of curvature based on the first change. In various embodiments, each of the first distance and the second distance are defined between the target waste receptacle and a grasping mechanism disposed at an end of the arm. In some embodiments, the camera is a video camera. In yet other embodiments, each of the first distance and the second distance are determined based on one of a number of pixels within the corresponding second image and third image.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the Figures, a detection and warning system (e.g., an alert system, a control system, etc.) is configured to obtain image data of a lift apparatus (e.g., a grabber assembly, an arm, a track, etc.) of a refuse vehicle and a target waste receptacle. The lift apparatus may be configured to grasp the waste receptacle when operated. However, if the lift apparatus and the waste receptacle are not properly aligned, the lift apparatus may knock or tip over the waste receptacle, therefore requiring the operator of the refuse vehicle to exit the cabin of the refuse vehicle, and pick up the spilled waste. A controller obtains the image data and uses the image data to predict if operation of the lift apparatus will knock over the waste receptacle. The controller can operate an alert system (e.g., warning lights, flashers, speakers, a display screen, etc.) to notify the operator that the lift apparatus is predicted to knock over the waste receptacle. The controller may also limit operation of the lift apparatus if the lift apparatus is predicted to knock over the waste receptacle.

Figure 1:
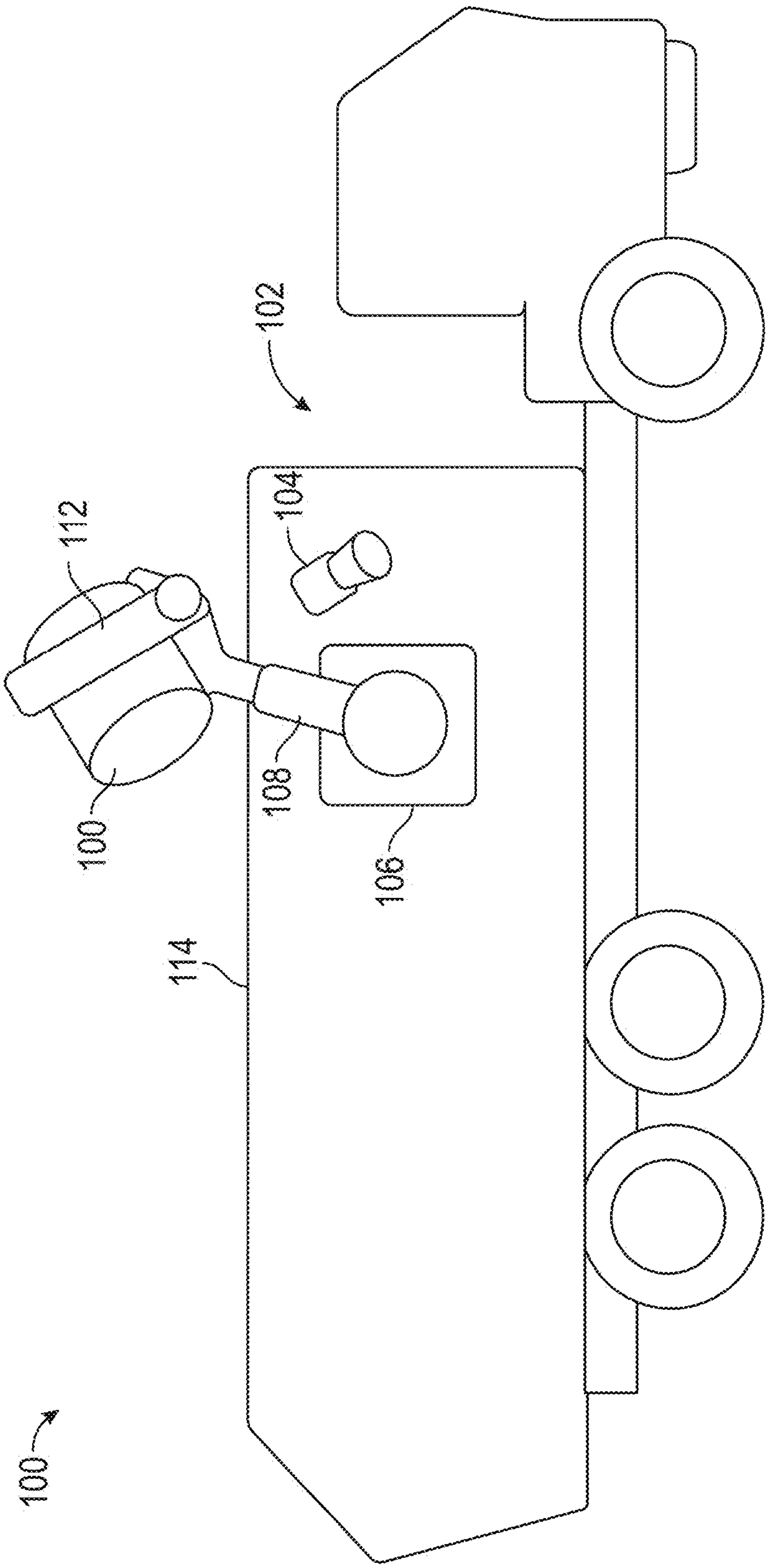
FIG. 1 is a schematic representation of a system for detecting and repositioning a waste receptacle, according to at least one embodiment.

Referring to FIG. 1, there is a system 100 for detecting and picking up a waste receptacle. The system 100 comprises a camera 104, an arm-actuation module 106, and an arm 108 for collecting the waste from a waste receptacle 110. According to some embodiments, the system 100 can be mounted on a waste-collection vehicle 102 (e.g., a refuse vehicle, a waste collection vehicle, a commercial vehicle, a vehicle with a lift apparatus, etc.). When the camera 104 detects the waste receptacle 110, for example along a curb, arm-actuation module 106 moves the arm 108 so that the waste receptacle 110 can be dumped into the waste-collection vehicle 102.

A waste receptacle is a container for collecting or storing garbage, recycling, compost, and other refuse, so that the garbage, recycling, compost, or other refuse can be pooled with other waste, and transported for further processing. Generally, waste may be classified as residential, commercial, industrial, etc. As used here, a "waste receptacle" may apply to any of these categories, as well as others. Depending on the category and usage, a waste receptacle may take the form of a garbage can, a dumpster, a recycling "blue box", a compost bin, etc. Further, waste receptacles may be used for curb-side collection (e.g., at certain residential locations), as well as collection in other specified locations (e.g., in the case of dumpster collection).

The camera 104 is positioned on the waste-collection vehicle 102 so that, as the waste-collection vehicle 102 is driven along a path, the camera 104 can capture real-time images adjacent to or in proximity of the path.

The arm 108 is used to grasp and move the waste receptacle 110. The particular arm that is used in any particular embodiment may be determined by such things as the type of waste receptacle, the location of the arm 108 on the waste-collection vehicle, etc.

The arm 108 is generally movable, and may comprise a combination of telescoping lengths, flexible joints, etc., such that the arm 108 can be moved anywhere within a three-dimensional volume that is within range of the arm 108.

According to some embodiments, the arm 108 may comprise a grasping mechanism 112 for grasping the waste receptacle 110. The grasping mechanism 112 may include any combination of mechanical forces (e.g., friction, compression, etc.) or magnetic forces to grasp the waste receptacle 110.

The grasping mechanism 112 may be designed for complementary engagement with a particular type of waste receptacle 110. For example, to pick up a cylindrical waste receptacle, such as a garbage can, the grasping mechanism 112 may comprise opposed fingers, or circular claws, etc., that can be brought together or cinched around the garbage can. In other cases, the grasping mechanism 112 may comprise arms or levers for complementary engagement with receiving slots on the waste receptacle.

Generally, the grasping mechanism 112 may be designed to complement a specific waste receptacle, a specific type of waste receptacle, a general class of waste receptacles, etc.

The arm-actuation module 106 is generally used to mechanically control and move the arm 108, including the grasping mechanism 112. The arm-actuation module 106 may comprise actuators, pneumatics, etc., for moving the arm. The arm-actuation module 106 is electrically controlled by a control system for controlling the movement of the arm 108. The control system can provide control instructions to the arm-actuation module 106 based on the real-time images captured by the camera 104.

The arm-actuation module 106 controls the arm 108 to pick up the waste receptacle 110 and dump the waste receptacle 110 into the bin 114 of the waste-collection vehicle 102. To accomplish this, the control system that controls the arm-actuation module 106 verifies whether a pose candidate derived from an image captured by the camera 104 matches a template representation corresponding to a target waste receptacle.

However, in order to be able to verify whether a pose candidate matches a template representation, the template representation must first be created. First, it is necessary to create template representations. Second, the template representations can be used to verify pose candidates based on real-time images. Pose candidates will be described in further detail below, after the creation of template representations is described.

Figure 2:
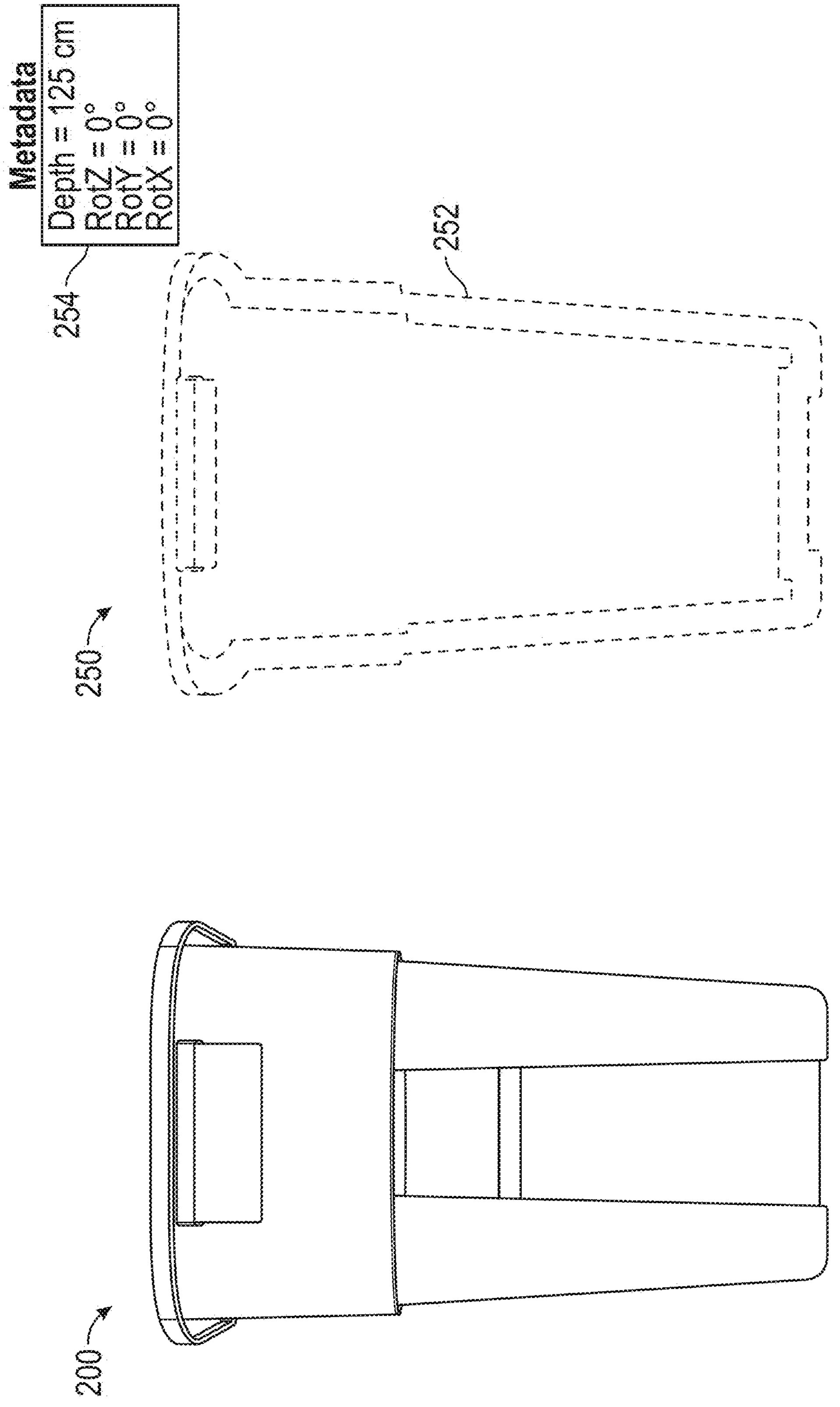
FIG. 2 is a pictorial representation of a waste receptacle and template representation associated with the waste receptacle, according to some embodiments.

Referring to FIG. 2, there is shown an example of a waste receptacle 200 and a template representation of a single pose 250 created in respect of the waste receptacle 200.

The template representation 250 is created by capturing multiple images of the object 200. These multiple images are captured by taking pictures at various angles and scales (depths) around the object 200. When a sufficient number of images have been captured for a particular object 200, the images are processed.

The final product of this processing is the template representation 250 associated with the object 200. In particular, the template representation 250 comprises gradient information data 252 and pose metadata 254. The complete object representation consists of a set of templates, one for each pose.

The gradient information 252 is obtained along the boundary of the object 200 as found in the multiple images. The pose metadata 254 are obtained from the pose information, such as the angles and scales (depths) at which each of the multiple images was captured. For example, the template representation 250 is shown for a depth of 125 cm, with no rotation about the X, Y, or Z axes.

Figure 3:
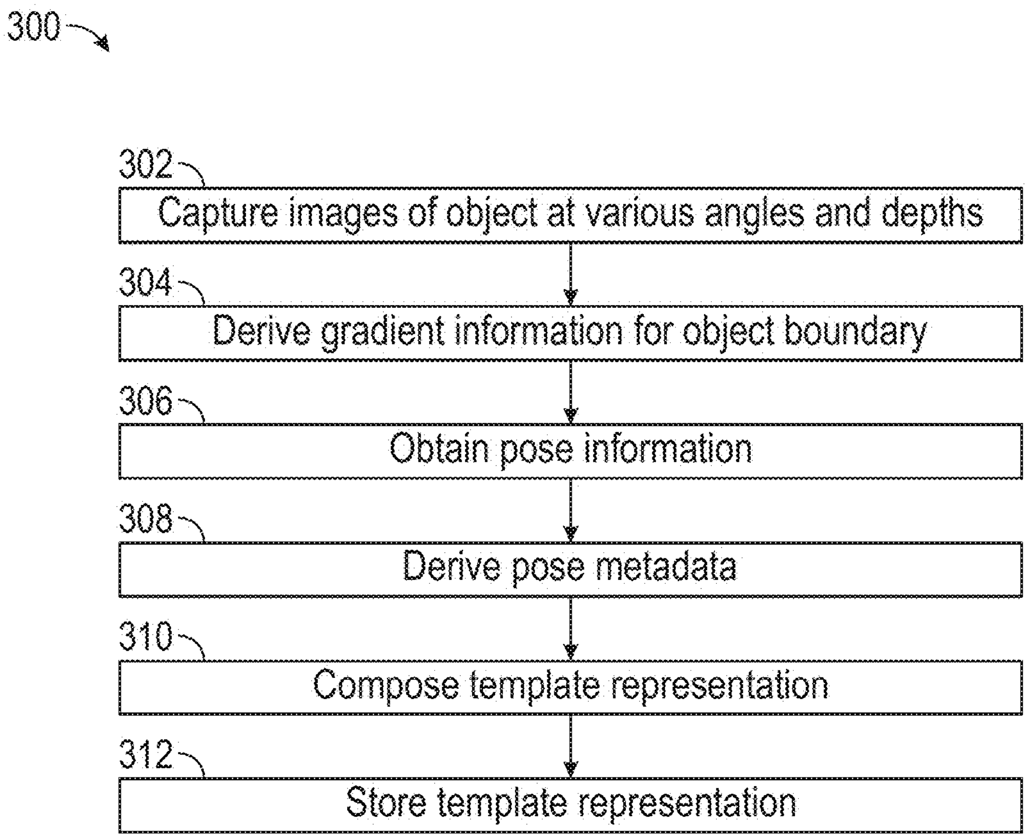
FIG. 3 is a flow diagram depicting a method for creating a representation of an object, according to some embodiments.

Referring to FIG. 3, there is shown a method 300 for creating a representation of an object.

The method begins at step 302, when images of an object are captured at various angles and scales (depths). The images are captured by taking pictures of an object, such as the waste receptacle 200, at various angles and scales (depths). Each image is associated with pose information, such as the depth, and the three-dimensional position and/or rotation of the camera in respect of a reference point or origin.

At step 304, gradient information is derived for the object boundary for each image captured. For example, as seen in FIG. 2, the gradient information is represented by the gradient information data 252. As can be seen, the gradient field comprising the gradient information data 252 corresponds to the boundaries (edges) of the waste receptacle 200.

At step 306, pose information associated with each image is obtained. For example, this may be derived from the position of the camera relative to the object, which can be done automatically or manually, depending on the specific camera and system used to capture the images.

At step 308, pose metadata are derived based on the pose information associated with each image. The pose metadata are derived according to a prescribed or pre-defined format or structure such that the metadata can be readily used for subsequent operations such as verifying whether a pose candidate matches a template representation.

At step 310, a template representation is composed using the gradient information and pose metadata that were previously derived. As such, a template representation comprises gradient information and associated pose metadata corresponding to each image captured.

At step 312, the template representation is stored so that it can be accessed or transferred for future use. Once the template representations have been created and stored, they can be used to verify pose candidates derived from real-time images, as will be described in further detail below. According to some embodiments, the template representations may be stored in a database. According to some embodiments, the template representations (including those in a database) may be stored on a non-transitory computer-readable medium. For example, the template representations may be stored in database 418, as shown in FIG. 4, and further described below.

Figure 4:
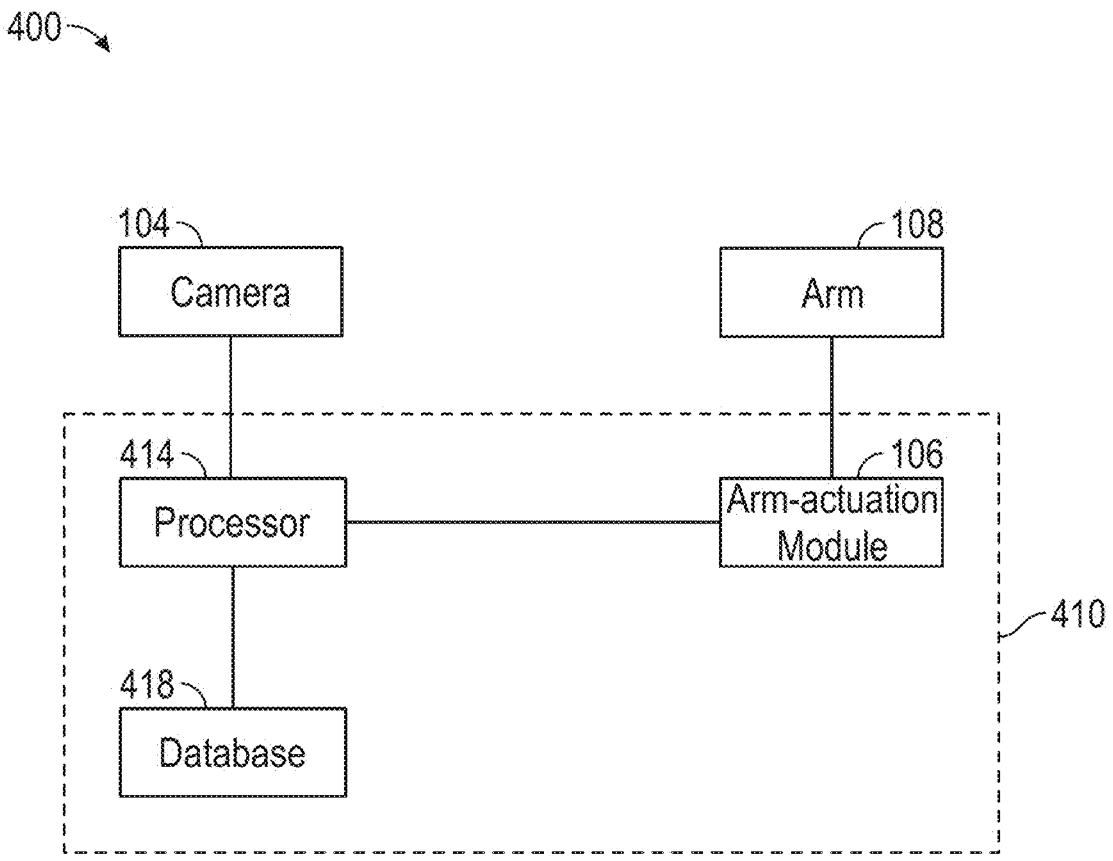
FIG. 4 is a network diagram showing a system for detecting and picking up a waste receptacle, according to some embodiments.

Referring to FIG. 4, there is shown a system 400 for detecting and picking up a waste receptacle. The system comprises a control system 410, a camera 104, and an arm 108. The control system 410 comprises a processor 414, a database 418, and an arm-actuation module 106. According to some embodiments, the system 400 can be mounted on or integrated with a waste-collection vehicle, such as waste-collection vehicle 102.

In use, the camera 104 captures real-time images adjacent to the waste-collection vehicle as the waste-collection vehicles is driven along a path. For example, the path may be a residential street with garbage cans placed along the curb. The real-time images from the camera 104 are communicated to the processor 414. The real-time images from the camera 104 may be communicated to the processor 414 using additional components such as memory, buffers, data buses, transceivers, etc., which are not shown.

The processor 414 is configured to recognize a waste receptacle, based on an image that it receives from the camera 104 and a template representation stored in the database 418.

Figure 5:
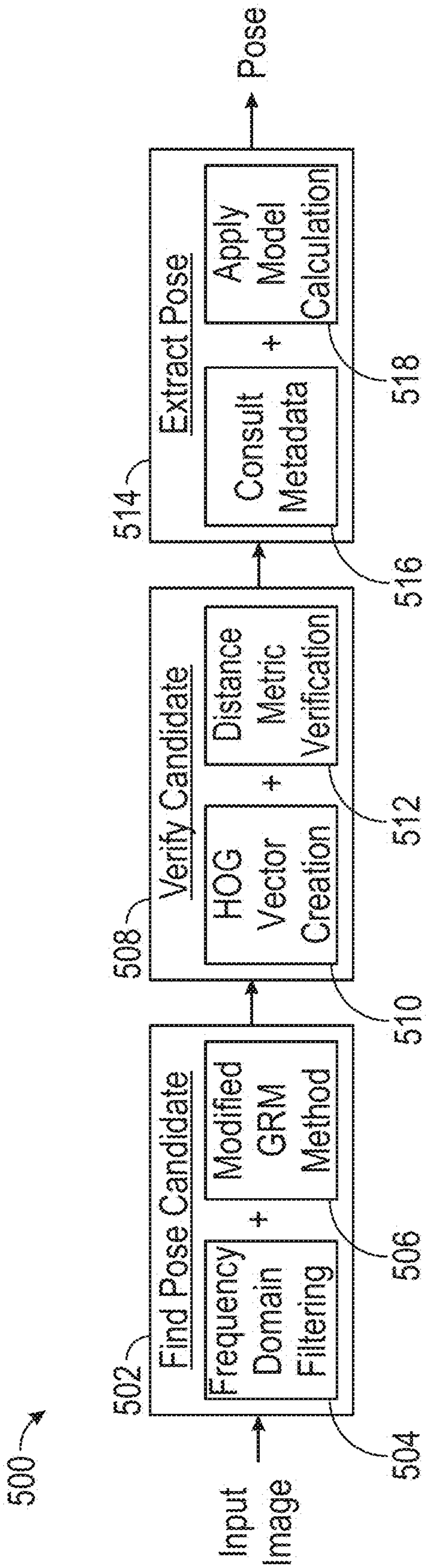
FIG. 5 is a flow diagram depicting a method pipeline used to detect and locate a waste receptacle, according to some embodiments.

Referring to FIG. 5, a general method 500 for detecting and locating a waste receptacle is shown, such as can be performed by the processor 414. The method 500 can be described as including the steps of generating a pose candidate 502, verifying the pose candidate 508, and calculating the location of the recognized waste receptacle 514 (i.e., extracting the pose).

The generate a pose candidate step 502 can be described in terms of frequency domain filtering 504 and a gradient-response map method 506. The step of verifying the pose candidate 508 can be described in terms of creating a histogram of oriented gradients (HOG) vector 510 and a distance-metric verification 512. The extract pose step 514 (in which the location of the recognized waste receptacle is calculated) can be described in terms of consulting the pose metadata 516, and applying a model calculation 518. The step of consulting the pose metadata 516 generally requires retrieving the pose metadata from the database 418.

Figure 6:
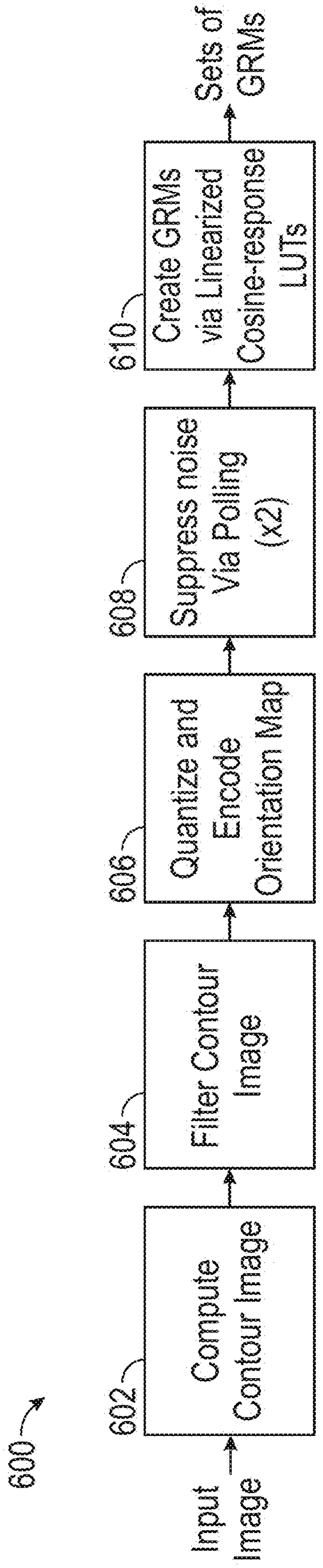
FIG. 6 is a flow diagram depicting an example of a modified Line2D gradient-response map method, according to some embodiments.

Referring to FIG. 6, there is shown a modified Line2D method 600 for implementing the generating pose candidate step 502. A Line2D method can be performed by the processor 414, and the instructions for a Line2D method may generally be stored in system memory (not shown).

A standard Line2D method can be considered to comprise a compute contour image step 602, a quantize and encode orientation map step 606, a suppress noise via polling step 608, and a create gradient-response maps (GRMs) via look-up tables (LUTs) step 610. In the method 600 as depicted, a filter contour image step 604 has been added as compared to the standard Line2D method. Furthermore, the suppress noise via polling step 608 and the create GRMs via LUTs step 610 have been modified as compared to the standard Line2D method.

The filter contour image step 604 converts the image to the frequency domain from the spatial domain, applies a high-pass Gaussian filter to the spectral component, and then converts the processed image back to the spatial domain. The filter contour image component 604 can reduce the presence of background textures in the image, such as grass and foliage.

The suppression of noise via polling step 608 is modified from a standard Line2D method by adding a second iteration of the process to the pipeline. In other words, polling can be performed twice instead of once, which can help reduce false positives in some circumstances.

The create GRMs via LUTs step 610 is modified from a standard Line2D method by redefining the values used in the LUTs. Whereas a standard Line2D method may use values that follow a cosine response, the values used in the LUTs in the modified component 610 follow a linear response.

Figure 7:
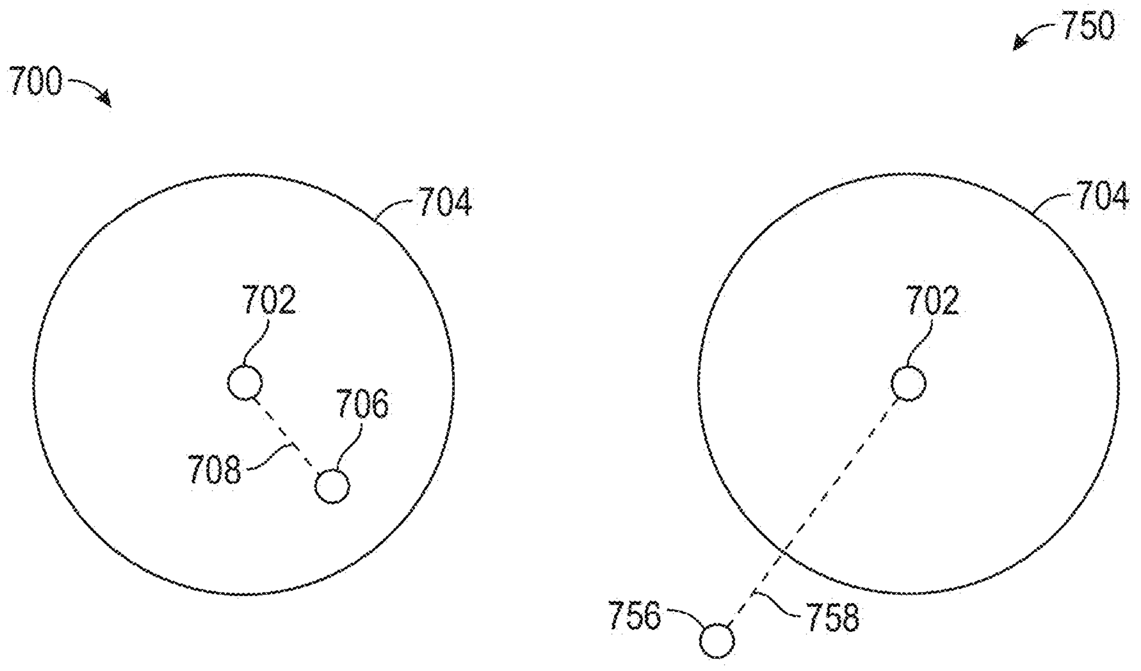
FIG. 7 is a pictorial representation of the verify candidate step of a method for detecting and locating a waste receptacle, according to some embodiments.

Referring to FIG. 7, there is shown a pictorial representation of the verify candidate step 508. Two examples are shown in FIG. 7. The first example 700 depicts a scenario in which a match is found between the HOG of the template representation and the HOG of the pose candidate. The second example 750 depicts a scenario in which a match is not found.

In each example 700 and 750, the HOG of a template representation 702 is depicted at the center of a circle that represents a pre-defined threshold 704.

Example 700 depicts a scenario in which the HOG of a pose candidate 706 is within the circle. In other words, the difference 708 (shown as a dashed line) between the HOG of the template representation 702 and the HOG of the pose candidate 706 is less than the pre-defined threshold 704. In this case, a match between the pose candidate and the template representation can be verified.

Example 750 depicts a scenario in which the HOG of a pose candidate 756 is outside the circle. In other words, the difference 758 between the HOG of the template representation 702 and the HOG of the pose candidate 756 is more than the pre-defined threshold 704. In this case, a match between the pose candidate and the template representation cannot be verified.

Referring again to FIG. 5, when a match between the pose candidate and the template representation has been verified at step 508, the method 500 proceeds to the extract pose step 514. This step exploits the pose metadata stored during the creation of the template representation of the waste receptacle. This step calculates the location of the waste receptacle (e.g., the angle and scale). The location of the waste receptacle can be calculated using the pose metadata, the intrinsic parameters of the camera (e.g., focal length, feature depth, etc.), and a pin-hole model.

Referring again to FIG. 4, once the location of the waste receptacle has been calculated, the arm-actuation module 106 can be used to move the arm 108 according to the calculated location of the waste receptacle. According to some embodiments, the processor 414 may be used to provide control instructions to the arm-actuation module 106. According to other embodiments, the control signals may be provided by another processor (not shown), including a processor that is integrated with arm-actuation module 106.

Figure 8:
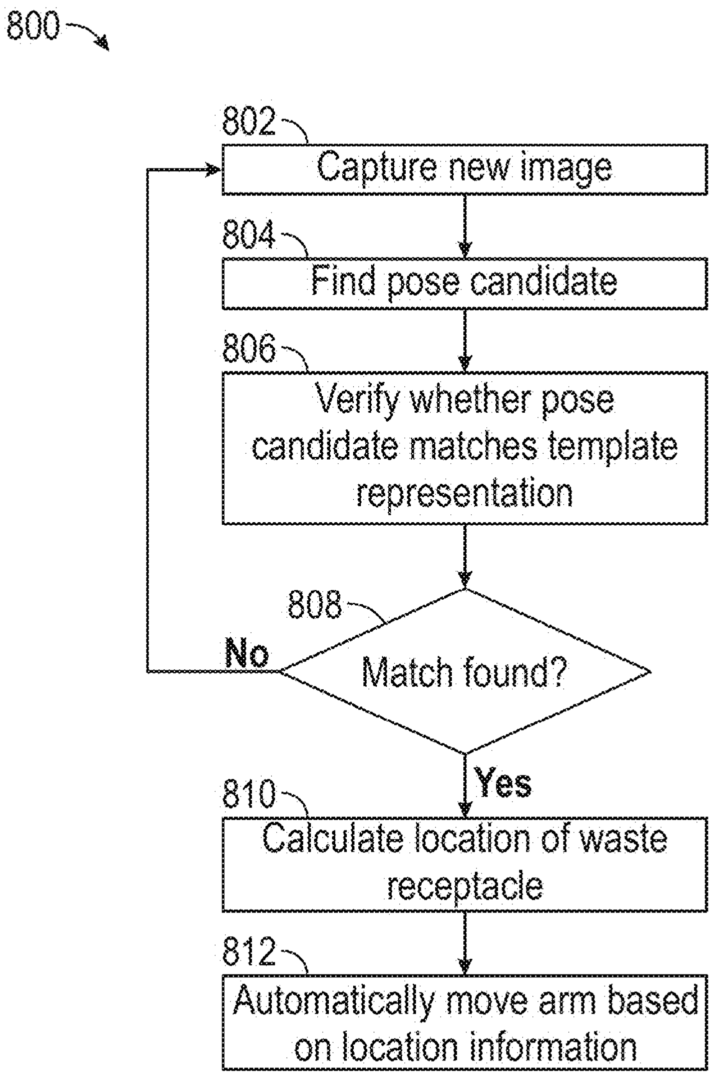
FIG. 8 is a flow diagram depicting a method for detecting and picking up a waste receptacle, according to some embodiments.

Referring to FIG. 8, there is shown a method for detecting and picking up a waste receptacle. The method begins at 802, when a new image is captured. For example, the new image may be captured by the camera 104, mounted on a waste-collection vehicle as it is driven along a path. According to some embodiments, the camera 104 may be a video camera, capturing real-time images at a particular frame rate.

At 804, the method finds a pose candidate based on the image. For example, the method may identify a waste receptacle in the image.

According to some embodiments, step 804 may include the steps of filtering the image and generating a set of gradient-response maps. For example, filtering the image may be accomplished by converting the image to the frequency domain, obtaining a spectral component of the image, applying a high-pass Gaussian filter to the spectral component, and then returning the image back to its spatial representation.

According to some embodiments, step 804 may include a noise suppression step. For example, noise can be suppressed via polling, and, in particular, superior noise-suppression results can be obtained by performing the polling twice (instead of once).

At 806, the method verifies whether the pose candidate matches the template representation. According to some embodiments, this is accomplished by comparing an HOG of the template representation with an HOG of the pose candidate. The difference between the HOG of the template representation and the HOG of the pose candidate can be compared to a pre-defined threshold such that, if the difference is below the threshold, then the method determines that a match has been found; and if the difference is above the threshold, then the method determines that a match has not been found.

At 808, the method queries whether a match between the pose candidate and the template representation during the previous step at 806. If a match is not found—i.e., if the waste receptacle (or other target object) was not found in the image—then the method returns to step 802, such that a new image is captured, and the method proceeds with the new image. If, on the other hand, a match is found, then the method proceeds to step 810.

At step 810, the location of the waste receptacle is calculated. According to some embodiments, the location can be determined based on the pose metadata stored in the matched template representation. For example, once a match has been determined at step 808, then, effectively, the waste receptacle (or another target object) has been found. Then, by querying the pose metadata associated with the matched template representation, the particular pose (e.g., the angle and scale or depth) can be determined.

At step 812, the arm 108 is automatically moved based on the location information. The arm may be moved via the arm-actuation module 106.

According to some embodiments, the arm 108 may be moved entirely automatically. In other words, the control system 410 may control the precise movements of the arm 108 necessary for the arm 108 to grasp the waste receptacle, lift the waste receptacle, dump the waste receptacle into the waste-collection vehicle, and then return the waste receptacle to its original position, without the need for human intervention.

According to other embodiments, the arm 108 may be moved automatically towards the waste receptacle, but without the precision necessary to move the waste receptacle entirely without human intervention. In such a case, the control system 410 may automatically move the arm 108 into sufficient proximity of the waste receptacle such that a human user is only required to control the arm 108 over a relatively short distance to grasp the waste receptacle. In other words, according to some embodiments, the control system 410 may move the arm 108 most of the way towards a waste receptacle by providing gross motor controls, and a human user (e.g., using a joystick control), may only be required to provide fine motor controls.

In various embodiments, the control system 410 can be configured to compensate for when the vehicle 102 is traversing along a curved route such that the system 100 can nevertheless detect and pickup the waste receptacle 110.

When the vehicle 102 is traversing along a curved route, the vehicle 102 may transition from a first position in which the grasping mechanism 112 is axially offset from the receptacle 110 to a second position in which the grasping mechanism 112 is substantially aligned with the receptacle 110 while the vehicle 102 is angled away from the receptacle.

Figure 9:
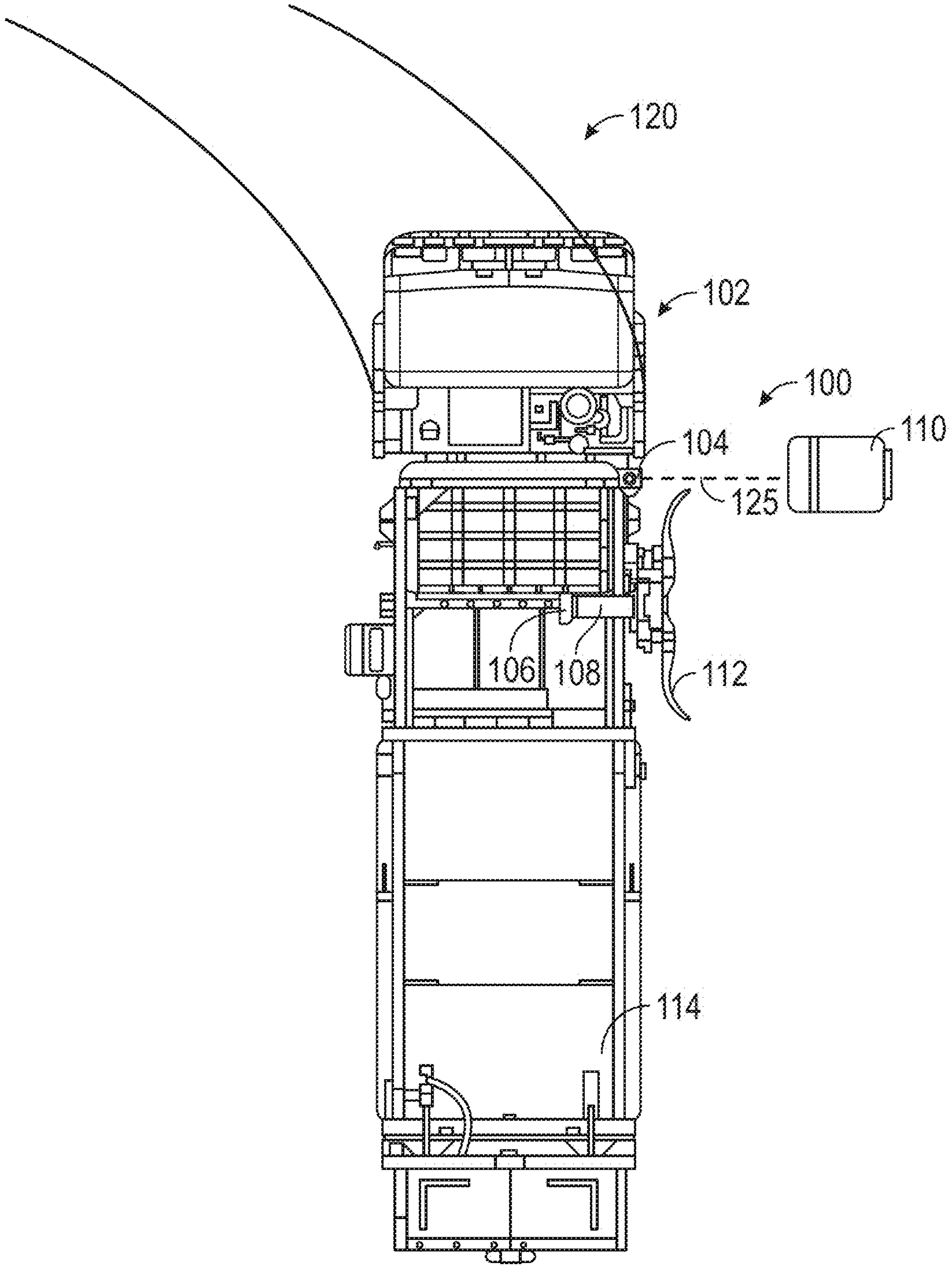
FIG. 9 is top view of the system of FIG. 1 at a first position and turning in a first direction relative to a waste receptacle, according to at least one embodiment.
Figure 10:
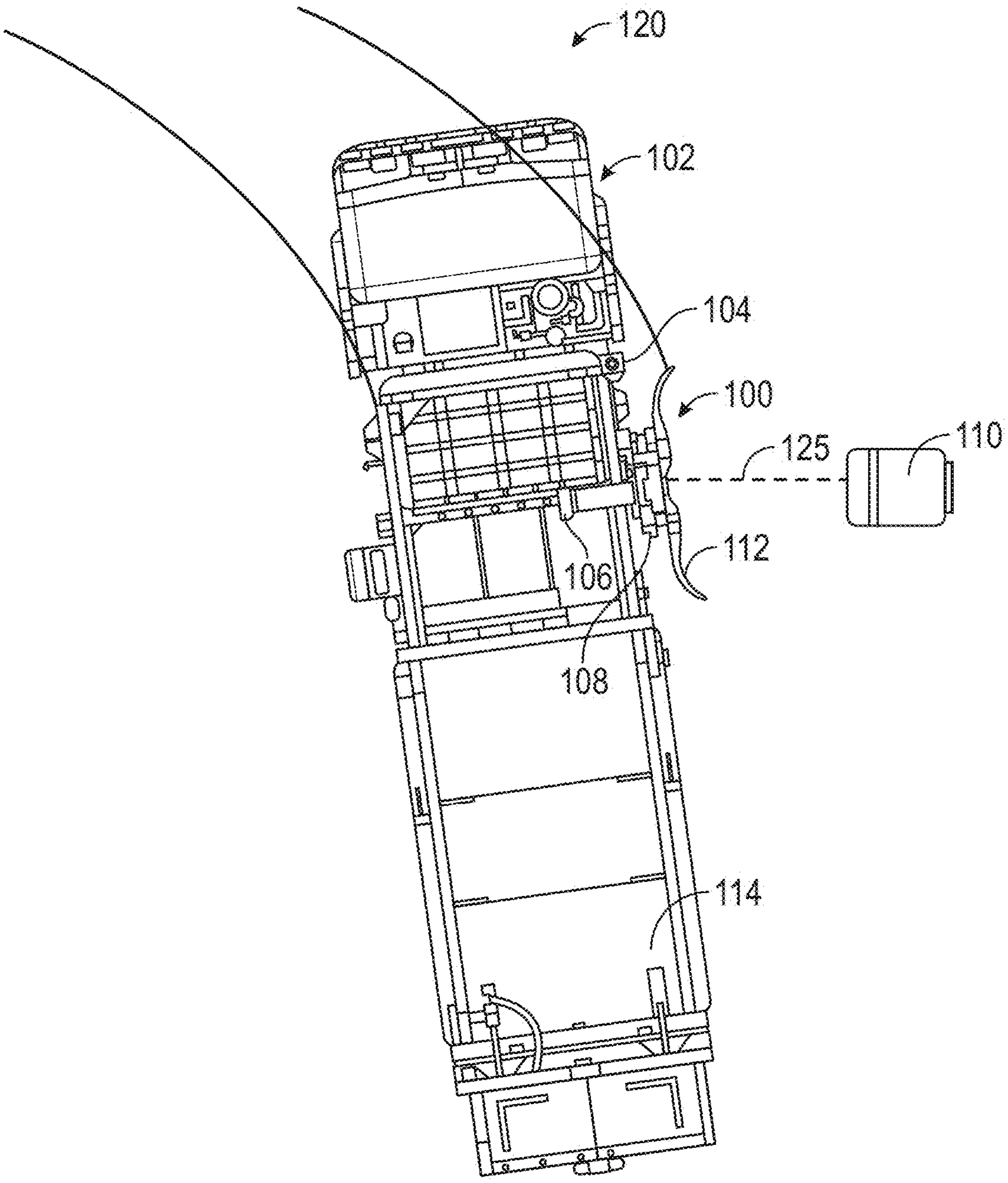
FIG. 10 is a top view of the vehicle of FIG. 9 at a second position and turning in the first direction relative to the waste receptacle, according to at least one embodiment.

For example, in some embodiments, and as shown in FIG. 9, the vehicle 102 may be traversing along a route 120, which curves away from the receptacle 110. As shown, when the vehicle 102 is in a first position and approaching the receptacle 110, the vehicle 102 can be substantially parallel to the receptacle 110 and the grasping mechanism 112 may be axially offset (i.e., behind) the receptacle 110. As the vehicle 102 traverses along the route 120 and approaches the receptacle 110, a front portion of the vehicle 102 can angle away from the receptacle 110, as shown in FIG. 10. Accordingly, as the vehicle traverses along the route 120 and moves from the first position (shown in FIG. 9) to the second position (shown in FIG. 10), a distance 125 between the grasping mechanism 112 and the receptacle 110 can change. In some embodiments, the distance 125 can increase as the vehicle 102 traverses along the route 120. In some embodiments, the distance 125 is defined as a perpendicular distance measured from a front portion of the receptacle 110. In other embodiments, the distance 125 can be defined as a point to point distance between a front portion of the receptacle 110 and a portion (e.g., front portion) of the grasping mechanism 112.

Figure 11:
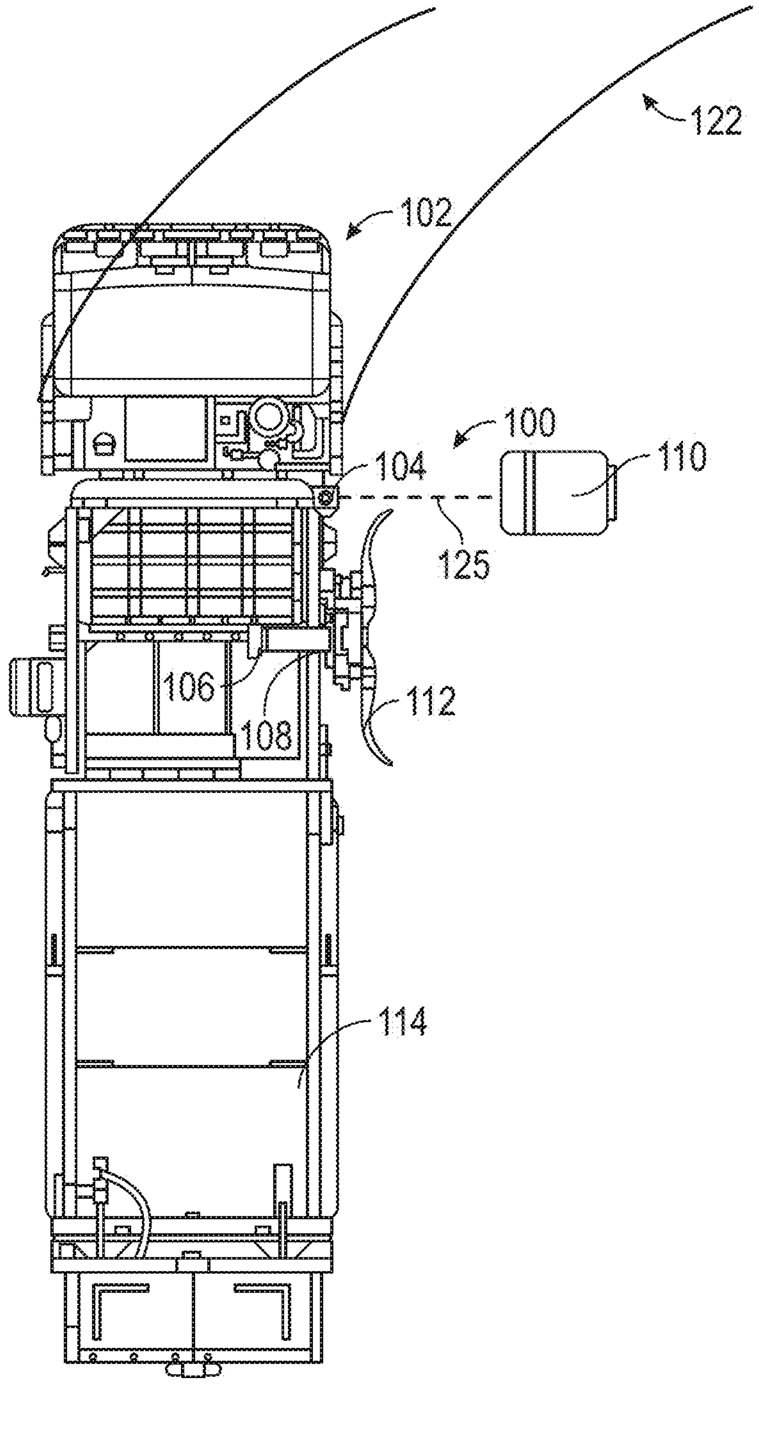
FIG. 11 is a top view of the system of FIG. 1 at a third position and turning in a second direction relative to a waste receptable, according to at least one embodiment.
Figure 12:
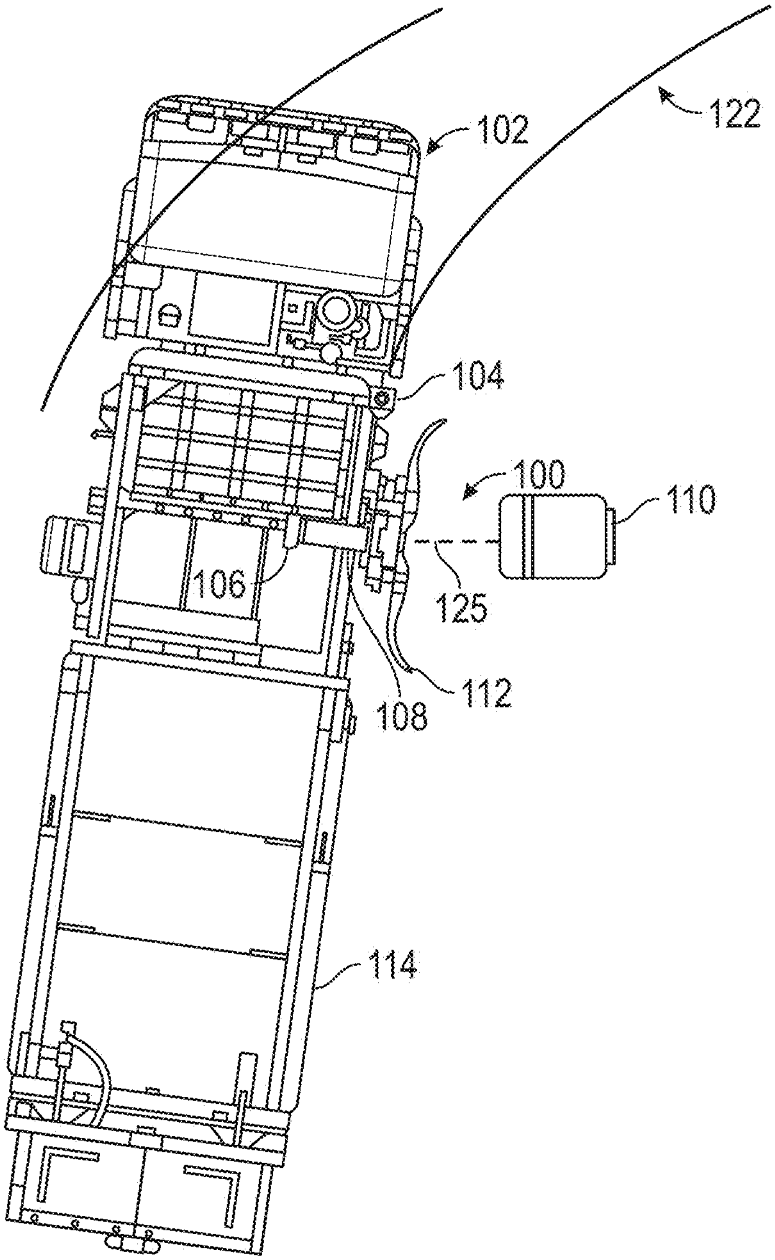
FIG. 12 is a top view of the system of FIG. 11 at a fourth position and turning in the second direction relative to a waste receptacle, according to at least one embodiment.
Figure 13:
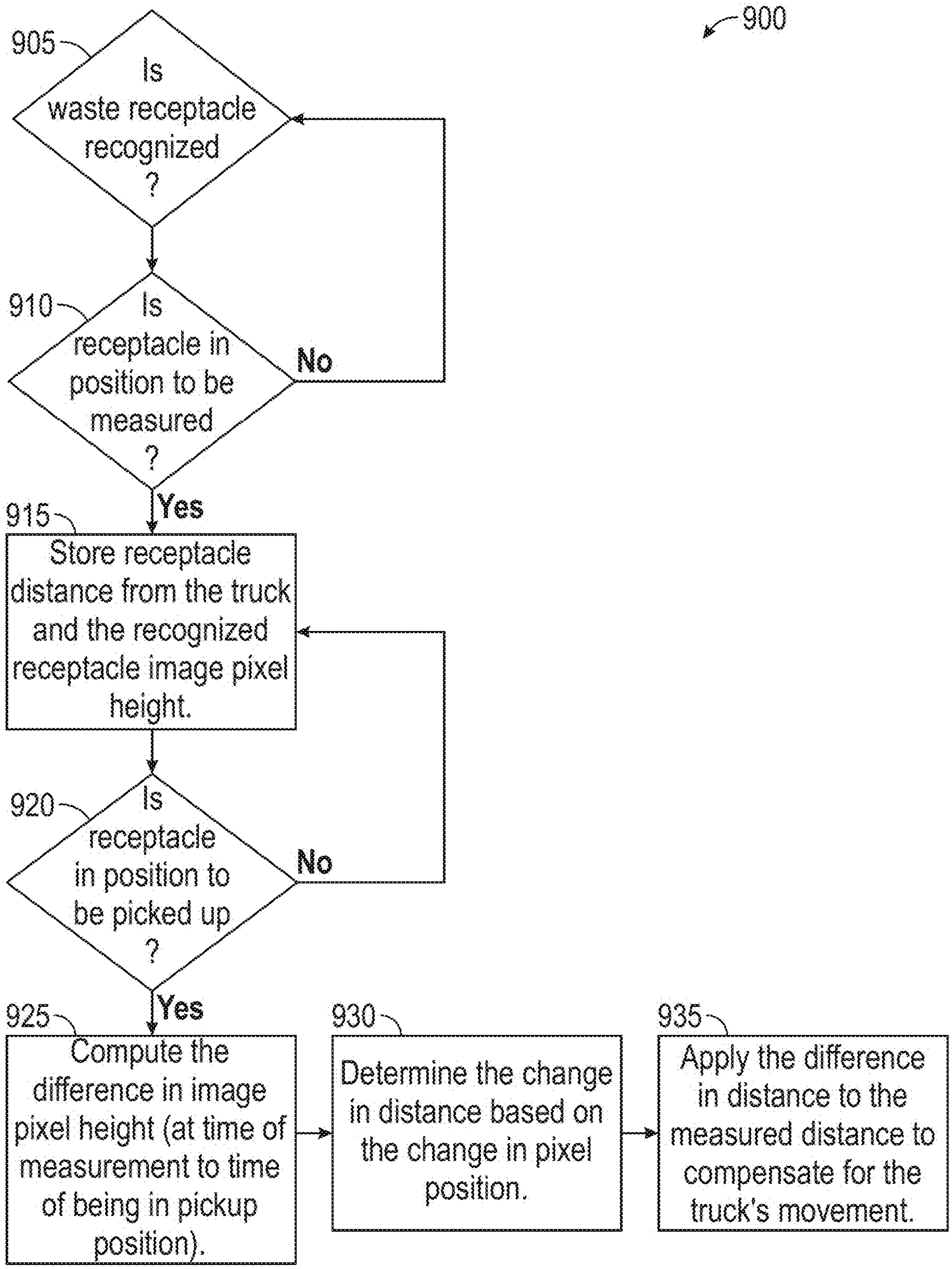
FIG. 13 is a flow diagram illustrating a method implemented by the system of FIG. 1 for detecting and repositioning a waste receptacle, according to at least one embodiment.

In other embodiments, as shown in FIG. 11, the vehicle 102 may be traversing along a route 122, which curves toward from the receptacle 110. As shown, when the vehicle 102 is in a first position and approaching the receptacle 110, the vehicle 102 can be substantially parallel to the receptacle 110 and the grasping mechanism 112 may be axially offset (i.e., behind) the receptacle 110. As the vehicle 102 traverses along the route 122 and approaches the receptacle 110, a front portion of the vehicle 102 can angle toward the receptacle 110, as shown in FIG. 12. Accordingly, as the vehicle traverses along the route 122 and moves from the first position (shown in FIG. 11) to the second position (shown in FIG. 12), the distance 125 between the grasping mechanism 112 and the receptacle 110 can change. In some embodiments, the distance 125 can decrease as the vehicle 102 traverses along the route 122. As described above, in some embodiments, the distance 125 can be defined as a perpendicular distance measured from a front portion of the receptacle 110. In other embodiments, the distance 125 can be defined as a point to point distance between a front portion of the receptacle 110 and a portion (e.g., front portion) of the grasping mechanism 112.

In various embodiments, the distance 125 can be determined by the control system 410 (i.e., via the processor 414) while the vehicle 102 is traversing along a curved route (e.g., route 120, route 122) based on one or more inputs received by the camera 104. In some embodiments, the control system 410 can be configured to determine the distance 125 repeatedly while the vehicle 102 is traversing along the curved route 120 or 122. Accordingly, in some embodiments, the control system 410 can determine, based on the measured distance 125 (and/or based on a change or trend in the measured distance 125 over the repeated determinations), a trajectory of the vehicle 102 and/or a curvature of the route (e.g., route 120, route 122). For example, the control system 410 can determine, based on the measured distance 125 (and/or based on the change or trend in the measured distance over repeated determinations) whether the vehicle 102 is traversing along a route that curves away from the receptacle 110 (e.g., route 120). In other embodiments, the control system 410 can determine, based on the measured distance 125 (or based on the change or trend in the measured distance 125 over repeated determinations) whether the vehicle 102 is traversing along a route that curves toward the receptacle 110 (e.g., route 122). The control system 410 can be configured to control the arm 108 based on the distance 125 and/or the curvature of the route (e.g., route 120, route 122). For example, in some embodiments, the control system 410 (i.e., via the processor 414) can determine a radius of curvature of the route (e.g., route 120, route 122) based on the distance 125 and/or a change or trend in the distance 125. Based on the radius of curvature of the route, the control system 410 can then control the arm 108. In various embodiments, the control system 410 can determine whether the route curves toward or away from the receptacle 110 based on the radius of curvature.

Referring to FIG. 9, a method 900 for detecting and picking up a waste receptacle during a curved vehicle route is shown, according to at least one embodiment. As described above, when the vehicle 102 is traveling along a curved route, the control system 410 can be configured to compensate for changes in the distance 125 between the vehicle 102 and the waste receptacle 110 in accordance with a radius of curvature associated with the curved route (e.g., route 120, 122). In some embodiments, the method 900 can be implemented by the control system 410. In various embodiments, the method 900 is a subroutine carried out by the control system 410 as part of the method 800. For example, in some implementations, the method 900 can be carried out during the step 810 of the method 800. In other embodiments, the method 900 can be carried out by the control system 410 as a standalone routine.

As shown in FIG. 9, the method 900 begins at step 905, in which the control system 410 determines if a waste receptacle 110 is recognized. For example, in various embodiments, the camera 104 can be configured to capture one or more new images as the vehicle 102 is driven along the curved route 120 or 122. In various embodiments, the camera 104 may be a video camera, capturing real-time images at a particular frame rate. As described above, as the images from the camera 104 are communicated to the processor 414, the processor 414 is configured to recognize a waste receptacle by comparing the images collected by the camera 104 and a template representation stored in the database 418. In various embodiments, the control system 410 can be configured to repeat the step 905 until a waste receptacle 110 is recognized.

If a waste receptacle 110 is recognized in the step 905, the control system 410 can advance to the step 910 in which it determines whether the receptacle 110 is in a position to be measured. In various embodiments, the control system 410 can be configured to determine whether the receptacle 110 is in position to be measured based on whether a side (or a portion thereof) of the receptacle 110 is suitably visible to the camera 104. For example, in some embodiments, the control system 410 can be configured to determine whether the images received from the camera 104 have at least a minimum allowable resolution (i.e., resolution threshold, an) such that the portion of the image containing the recognized receptacle 110 has above a threshold number of pixels. In some embodiments, the control system 410 may determine the receptacle 110 is not in a position to be measured responsive to a determination that one or more images collected by the camera 104 are below the allowable resolution and/or that a portion of the collected image containing the receptacle 110 (or a portion thereof) contains below the threshold number of pixels. In various embodiments, if the control system 410 determines the receptacle 110 is not in position to be measured, the control system 410 can return to the step 905. In some implementations, the control system 410 can iterate through the steps 905 and 910 together with a repositioning of the vehicle 102 until the receptacle 110 is both recognized and in position to be measured.

If the control system 410 determines the receptacle 110 is in position to be measured in the step 910, the control system 410 can determine and store (e.g., in a memory within the control system 410) the distance 125 between the vehicle 102 and the receptacle 110 in the step 915. In various embodiments, the control system 410 can be configured to calculate or estimate the distance 125 based on a number of pixels within images captured by the camera 104. In other embodiments, the system 100 can also include at least one proximity sensors in communication with the control system 410. Accordingly, in such embodiments, the control system 410 can be configured to determine the distance 125 based on one or more inputs from the at least one proximity sensors alone or in conjunction with input from the camera 104. In various embodiments, upon determining the distance 125, the control system 410 can be configured to store the distance 125 and a height of the receptacle 110, where the height 110 is defined in terms of the pixel height in corresponding images collected by the camera 104.

Based on the distance 125 and the height stored during the step 915, the control system 410 can determine whether the receptacle 110 is in position to be collected (i.e., picked up) by the system 100. In various embodiments, if the control system 410 determines that at least one of the height or the distance 125 above or below a predetermined threshold, the control system 410 can determine the receptacle 110 is not in position to be collected. In various embodiments, the threshold can be a range. For example, in some embodiments, the control system 410 can be configured to determine the distance 125 is greater than an upper limit of a predetermined threshold range, indicating the receptacle 110 is too far from the vehicle 102 to be collected. Similarly, the control system 410 can be configured to determine the distance 125 is less than a lower limit of the predetermined threshold range, indicating the receptacle 110 is too close to the vehicle 102 and the arm 108 may not have sufficient room to articulate and collect the receptacle 110. In other embodiments, the control system 410 can be configured to determine the height is above an upper limit of a predetermined threshold, indicating the receptacle 110 is positioned too close to the vehicle 102 to allow collection. In other embodiments, the control system 410 can be configured to determine the height is below a lower limit of the predetermined threshold, indicating the receptacle 110 is too far from the vehicle 102 to allow collection. In some implementations, the control system 410 can iterate between the steps 915 and 920 together with a repositioning of the vehicle 102 until the receptacle 110 is determined to be in position for collection.

If the control system 410 determines the receptacle is suitably positioned for collection in the step 920, the control system 410 can advance to the step 425. In carrying out the step 925, the control system 410 can determine a difference in height between subsequent images captured by the camera 104 to determine a predicted difference at a time of receptacle 110 collection. For example, the control system 410 can determine a first height in a first image based on a first position of pixels and determine a second height in a second image based on a second position of pixels. Based on the time elapsed between capture of the first image and the second image, the control system 410 can determine (i.e., extrapolate) a predicted amount of change in pixel position, and thus a predicted change in height, at a time of collection of the receptacle 110.

Using the predicted change in height (based on the change in pixel position) determined in the step 925, the control system 410 can be configured to determine a predicted change in the distance 125 between a current timepoint and a future time at which the receptacle 110 is to be collected in the step 930. In various embodiments, the control system 410 can be configured to determine the predicted change in distance 125 using one or more lookup tables and/or known formulas. Using the predicted change in distance 125, the control system 410 can adjust movement of the arm 108 to collect the receptacle 110 as the vehicle 102 traverses along the route 120 or 122 in step 935. For example, the control system 410 can be configured to compensate measurement of the distance 125 (and thus control the arm 108 based on the compensation) as the vehicle 102 traverses along the route 120 or 122 toward the receptacle 110 using the predictions determined in the step 930. In this manner, the control system 410 can be configured to compensate for curved travel of the vehicle 102 during collection of the receptacle 110.

In various embodiments, the control system 410 for the refuse vehicle 102 includes the camera 104 configured to obtain image data of the target waste receptacle 110 and at least one processor 414. The processor 414 can be configured to determine a first pixel height from a first image of the target waste receptacle 110 corresponding to the refuse vehicle 102 in a first position along a route (e.g., route 120, 122) determine a second pixel height from a second image of the target waste receptacle 110 corresponding to the refuse vehicle 102 in a second position along the route (e.g., route 120, 122) and based on a change between the first pixel height and the second pixel height, determine the measured distance 125 between the refuse vehicle 102 and the target waste receptacle 110. In some embodiments, the at least one processor 414 is configured to determine at least one of a vehicle trajectory or a curvature of the route (i.e., of the route 120 or 122) based at least on the measured distance 125. In other embodiments, the curvature of the route (i.e., the route 120 or 122) indicates the route curves away from the target waste receptacle 110. In yet other embodiments, the curvature of the route (i.e., the route 120 or 122) indicates the route curves toward the target waste receptacle 110.

In various embodiments, the at least one processor 414 is further configured to repeatedly determine the measured distance 125 to determine a change in the measured distance 125. In some embodiments, the at least one processor 414 is further configured to determine whether at least one of the first image or the second image satisfies a resolution threshold. In other embodiments, the at least one processor 414 is further configured to determine whether the target waste receptacle 110 is in position for measurement based on at least one of the first image or the second image satisfying the resolution threshold. In yet other embodiments, the at least one processor 414 is further configured to determine whether the target waste receptacle 110 is in position for collection based on the measured distance.

In various embodiments, the refuse vehicle 102 includes the arm 108, which is structured to collect the target receptacle 110, the camera 104 configured to obtain image data, and the at least one processor 414, which is communicatively coupled to the arm 108 and the camera 104. The at least one processor 414 is configured to determine whether a first image captured by the camera 104 contains the target waste receptacle 110. Responsive to determining the first image contains the target waste receptacle 110, the processor 414 is configured to determine whether the target waste receptacle 110 is in a position to be measured. Responsive to determining the target waste receptacle 110 is in the position to be measured, the processor 414 is configured to determine a first distance of the target waste receptacle 110 at a first time point from a second image. The processor 414 is further configured to determine a second distance of the target waste receptacle 110 at a second time point from a third image and, based on a first distance change between the second distance and the first distance, predict a second distance change between the second distance and a third distance at a third time point and control the arm 108 to collect the target waste receptacle 110 based on the predicted second distance change.

In various embodiments, the at least one processor 414 is configured to predict the second distance change based on a time elapsed between capture of the second image and the third image. In some embodiments, the at least one processor 414 is further configured to determine a change in a height of the target waste receptacle 110 (i.e., a measured height) from the second image and the third image. In other embodiments, the change in height (i.e., change in measured height) is based on a change in pixel position. In other embodiments, the predicted second distance change is determined using one or more lookup tables. In yet other embodiments, the at least one processor 414 is configured to determine whether the target waste receptacle 110 is in a position to be measured based on a determination that the first image satisfies a resolution threshold. In some embodiments, the at least one processor 414 is configured to determine whether a first image captured by the camera 104 contains the target waste receptacle 110 based on a comparison of the first image to a template representation stored in a database.

In other embodiments, the at least one processor 414 is configured to determine a radius of curvature of the route along which the refuse vehicle is traversing (i.e., of the route 120 or 122). In yet other embodiments, the at least one processor 414 determines the radius of curvature based on the first change. In various embodiments, each of the first distance and the second distance are defined between the target waste receptacle 110 and the grasping mechanism 112 disposed at an end of the arm 108. In some embodiments, each of the first distance and the second distance are determined based on one of a number of pixels within the corresponding second image and third image.

Notwithstanding the embodiments described above in FIGS. 1-13, various modifications and inclusions to those embodiments are contemplated and considered within the scope of the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A control system for a refuse vehicle, the system comprising:

a camera configured to obtain image data of a target waste receptacle; and at least one processor configured to:

determine a first pixel height from a first image of the target waste receptacle corresponding to the refuse vehicle in a first position along a route;

determine a second pixel height from a second image of the target waste receptacle corresponding to the refuse vehicle in a second position along the route; and based on a change between the first pixel height and the second pixel height, determine a measured distance between the refuse vehicle and the target waste receptacle.

2. The control system of claim 1, wherein the at least one processor is configured to determine at least one of a vehicle trajectory or a curvature of the route based at least on the measured distance.

3. The control system of claim 2, wherein the curvature of the route indicates the route curves away from the target waste receptacle.

4. The control system of claim 2, wherein the curvature of the route indicates the route curves toward the target waste receptacle.

5. The control system of claim 1, wherein the at least one processor is further configured to repeatedly determine the measured distance to determine a change in the measured distance.

6. The control system of claim 5, wherein the at least one processor is further configured to determine whether the target waste receptacle is in position for measurement based on at least one of the first image or the second image satisfying the resolution threshold.

7. The control system of claim 1, wherein the at least one processor is further configured to determine whether at least one of the first image or the second image satisfies a resolution threshold.

8. The control system of claim 1, wherein the at least one processor is further configured to determine whether the target waste receptacle is in position for collection based on the measured distance.

9. A refuse vehicle comprising:

an arm structured to collect a target waste receptacle;

a camera configured to obtain image data; and at least one processor communicatively coupled to the arm and the camera, the at least one processor configured to:

determine whether a first image captured by the camera contains the target waste receptacle;

responsive to determining the first image contains the target waste receptacle, determine whether the target waste receptacle is in a position to be measured;

responsive to determining the target waste receptacle is in the position to be measured, determine a first distance of the target waste receptacle at a first time point from a second image;

determine a second distance of the target waste receptacle at a second time point from a third image;

based on a first distance change between the second distance and the first distance, predict a second distance change between the second distance and a third distance at a third time point; and control the arm to collect the target waste receptacle based on the predicted second distance change.

10. The refuse vehicle of claim 9, wherein the at least one processor is configured to predict the second distance change based on a time elapsed between capture of the second image and the third image.

11. The refuse vehicle of claim 9, wherein the at least one processor is further configured to determine a change in a height of the target waste receptacle from the second image and the third image.

12. The refuse vehicle of claim 11, wherein the change in height is based on a change in pixel position.

13. The refuse vehicle of claim 9, wherein the predicted second distance change is determined using one or more lookup tables.

14. The refuse vehicle of claim 9, wherein the at least one processor is configured to determine whether the target waste receptacle is in a position to be measured based on a determination that the first image satisfies a resolution threshold.

15. The refuse vehicle of claim 9, wherein the at least one processor is configured to determine whether a first image captured by the camera contains the target waste receptacle based on a comparison of the first image to a template representation stored in a database.

16. The refuse vehicle of claim 9, wherein the at least one processor is configured to determine a radius of curvature of a route along which the refuse vehicle is traversing.

17. The refuse vehicle of claim 16, wherein the at least one processor determines the radius of curvature based on the first change.

18. The refuse vehicle of claim 9, wherein each of the first distance and the second distance are defined between the target waste receptacle and a grasping mechanism disposed at an end of the arm.

19. The refuse vehicle of claim 9, wherein the camera is a video camera.

20. The refuse vehicle of claim 9, wherein each of the first distance and the second distance are determined based on one of a number of pixels within the corresponding second image and third image.

* * * * *